(12) United States Patent
Schoene et al.

(10) Patent No.: US 6,986,370 B1
(45) Date of Patent: Jan. 17, 2006

(54) TABLE SAW

(75) Inventors: Keith R. Schoene, St. Charles, MO (US); Curtis J. Eccardt, Defiance, MO (US)

(73) Assignee: Home Depot U.S.A., Inc., Atlanta, GA (US)

( * ) Notice: Subject to any disclaimer, the term of this patent is extended or adjusted under 35 U.S.C. 154(b) by 0 days.

(21) Appl. No.: 09/495,733

(22) Filed: Feb. 1, 2000

(51) Int. Cl.
   *B25H 1/14* (2006.01)
   *B23D 47/02* (2006.01)
   *B27B 5/22* (2006.01)

(52) U.S. Cl. ............... 144/287; 144/286.1; 83/477.2; 108/102; 108/143; 269/289 R

(58) Field of Classification Search ............ 144/286.1, 144/286.5, 287; 83/477, 477.2, 466.1; 108/102, 108/143, 69, 83, 88, 89; 269/289 R, 292, 269/296, 901; D15/133
See application file for complete search history.

(56) References Cited

U.S. PATENT DOCUMENTS

| | | | | |
|---|---|---|---|---|
| 4,566,510 A | * | 1/1986 | Bartlett et al. | 83/477.2 X |
| 4,726,405 A | * | 2/1988 | Bassett | 144/287 |
| 5,115,847 A | * | 5/1992 | Taber | 144/287 |
| 5,116,249 A | * | 5/1992 | Shiotani et al. | 144/287 X |
| 5,875,828 A | * | 3/1999 | Quiram et al. | 144/287 X |
| 5,954,106 A | * | 9/1999 | Huang | 144/286.5 |
| 6,112,785 A | * | 9/2000 | Yu | 144/287 |
| 6,189,429 B1 | * | 2/2001 | Liu | 144/287 X |

* cited by examiner

*Primary Examiner*—Clark F. Dexter
(74) *Attorney, Agent, or Firm*—Robert B Dulaney, III

(57) ABSTRACT

A table saw apparatus including an extendable table. The table saw also includes a rip fence with a constant alignment spring finger to ensure alignment at all times between the rip fence and the table saw blade. The table saw further includes a self-adjusting rip fence scale associated with the extending portion of the table. The table saw further includes a self-aligning blade guard that, once adjusted a first time, ensures alignment between the blade guard and the blade on any subsequent installations of the guard. The table saw also includes a novel cradle assembly for elevating and beveling the blade.

9 Claims, 11 Drawing Sheets

TABLE SAW

BACKGROUND OF THE INVENTION

This invention relates generally to table saws and improvements thereto. More particularly, the invention relates to a table saw with a locking extendable table.

Table saws have been generally well known in the art for many decades. A recent trend with table saws has been to create portable table saws that enable a user to more easily transport the table saws from one work site to another. The advantages of portable table saws are readily apparent. Portable table saws may be quickly moved by hand, automobile, or other convenient transportation means without disassembling the table saw or transporting the saw in very large vehicles. Portable table saws are generally much smaller and easier to lift and carry than a conventional stationary table saw. Unfortunately, the compact nature of portable table saws often prevents the user from effectively using the portable table saw for cutting large and bulky items as the table surface is generally much smaller than a full size stationary table saw. This reduced cutting or ripping capacity of portable table saws has led to confining the table saw operator to decide between purchasing and using a portable table saw with its advantages and limitations, or purchasing a full size stationary saw with its different advantages and limitations.

Conventional portable table saws also often include rip fences that are less accurate than their stationary full sized counterparts. The operator may have to sacrifice cutting accuracy to afford himself the convenience of a portable table saw.

Additionally, conventional table saws often include many attachments such as a mitre gauge, rip fence, blade guard, and other attachments. Often with conventional portable table saws each of these attachments must be individually transported along with the table saw, increasing the inconvenience of using and transporting the portable saw.

Although there have been table saws manufactured with extendable tables, often the extensions are not lockable in any position and require the addition of other pieces not integral to the table itself. The extensions add the problem of rip fence scale adjustment. When an extension is added to a conventional table saw, the rip fence scale must somehow be adjusted to compensate for the change in table dimensions.

Still further, conventional table saws sometimes come equipped with a motor blade and cradle capable of adjustment. However, the accuracy of the adjustment often leaves much to be desired. With existing adjusting means, precise cutting angles often are not possible.

The present invention is directed to overcoming, or at least reducing the effects of, one or more of the issues set forth above.

SUMMARY OF THE INVENTION

In accordance with one aspect of the present invention, a table saw is provided. The table saw includes a first table mounted to a base and a second table substantially coplanar with the first table and attached to first and second rails. The second table is adapted to be slidably movable relative to the first table.

In accordance with another aspect of the present invention, a rip fence for a table saw is provided. The rip fence includes a longitudinal body with first and second ends, a head with at least one head glide, the head being attached to the first end and engagable with a first rail, and a spring finger incorporated onto the at least one head glide.

In accordance with another aspect of the present invention, a rip fence scale for use with a table saw is provided. The rip fence scale includes a flexible tape measure extending along a top side of the first rail and continuing around both first and second ends of the first rail to extend along at least a portion of the length of the underside of the first rail.

In accordance with another aspect of the present invention, a blade guard for use with a table saw is provided. The blade guard includes a mounting plate with at least two pins extending therefrom, and a guard connected to the support, wherein the at least two pins are engagable with the table saw to cause the guard to self align with a table saw blade.

In accordance with yet another aspect of the present invention, a cradle assembly for a table saw is provided. The cradle assembly may include a cradle, an elevation mechanism mounted to the cradle, a motor assembly mounted to the elevation mechanism, and a bevel mechanism.

BRIEF DESCRIPTION OF THE DRAWINGS

The foregoing and other features and aspects of the invention will become further apparent upon reading the following detailed description and upon reference to the drawings in which.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Figure 1:
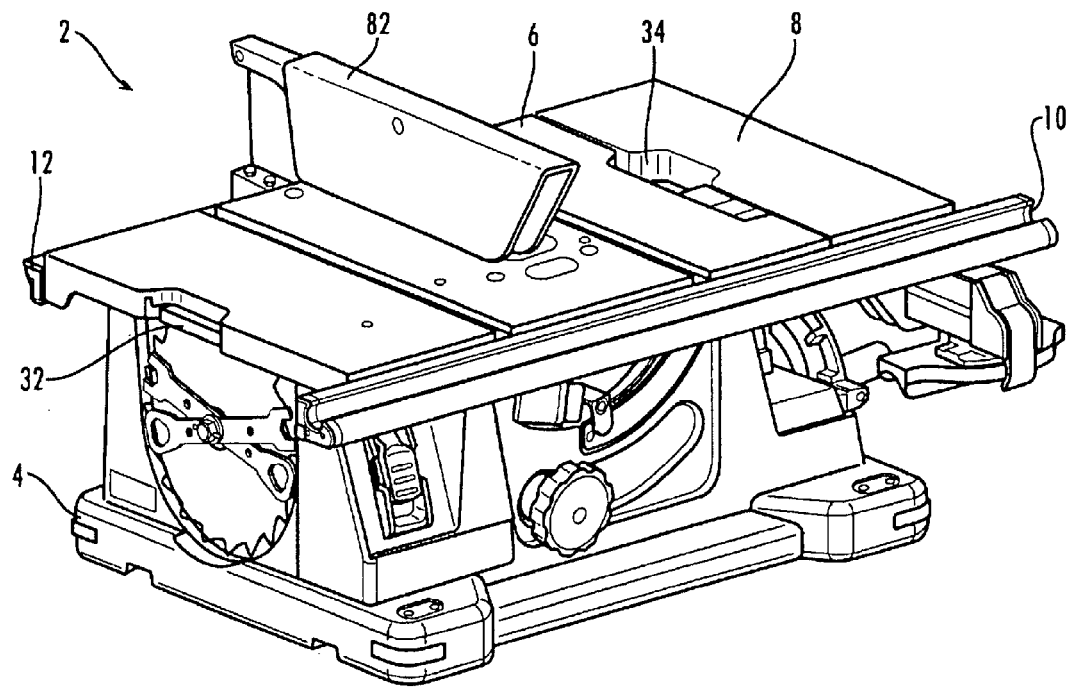
FIG. 1 is a perspective view of the table saw in accordance with one embodiment of the present invention.

Turning now to the figures, and in particular to FIG. 1, one embodiment of a table saw 2 in accordance with the present invention is illustrated. Table saw 2 includes a table that is generally constructed of two pieces that are independent of each other. Table saw 2 includes a stationary table, for example first table 6, mounted to a base 4. A table extension, for example second table 8, is attached to at least one rip fence rail. In the embodiment shown in FIG. 1, second table 8 is rigidly mounted to first and second rails 10 and 12, respectively. First rail 10 and second rail 12 are adapted to slide over slides 14 that are mounted on the first table, which allow second table 8 to be movable relative to first table 6. Second table 8 can be moved toward or away from first table 6 as desired by the operator. Having the table extension as a movable member allows the tables to be slid together for storage or smaller projects and slid apart to allow for an increased work surface and increased work support for larger projects. Second table 8 also allows the rip capacity to be increased on the second table 8 side of blade 146 when second table 8 is in the extended position shown in FIG. 2. Second table 8 affords portable table saw 2 the advantages of a smaller, easily portable saw while maintaining the ability to facilitate larger work products usually reserved for full size stationary saws. Second table 8 is a considerable advantage over other portable table saws which have only extending support bars that are not nearly as stable as second table 8.

At least one miter gauge groove 36 is disposed in first table 6, however, more than one groove may be part of first table 6, such as the two grooves 36 and 38 shown in the figures. In addition, at least one handle 32 is formed into first table 6 to facilitate the portable transport of the table saw from place to place. In the illustrated embodiment, two handles 32 and 34 are formed in first table 6.

Figure 3:
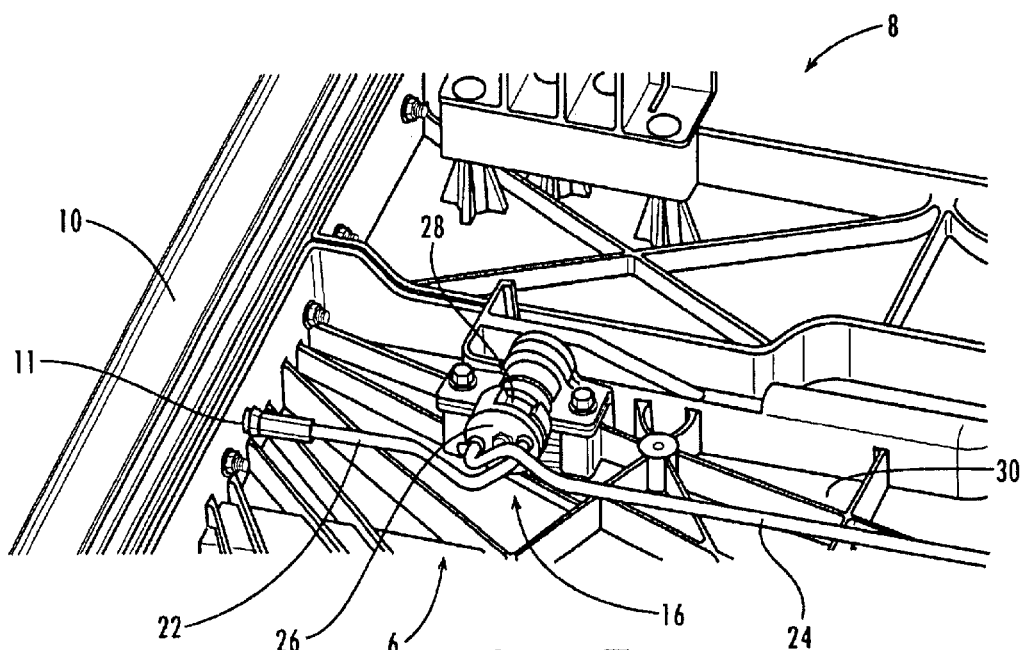
FIG. 3 is a partial bottom view of the table saw table according to FIG. 1.
Figure 3A:
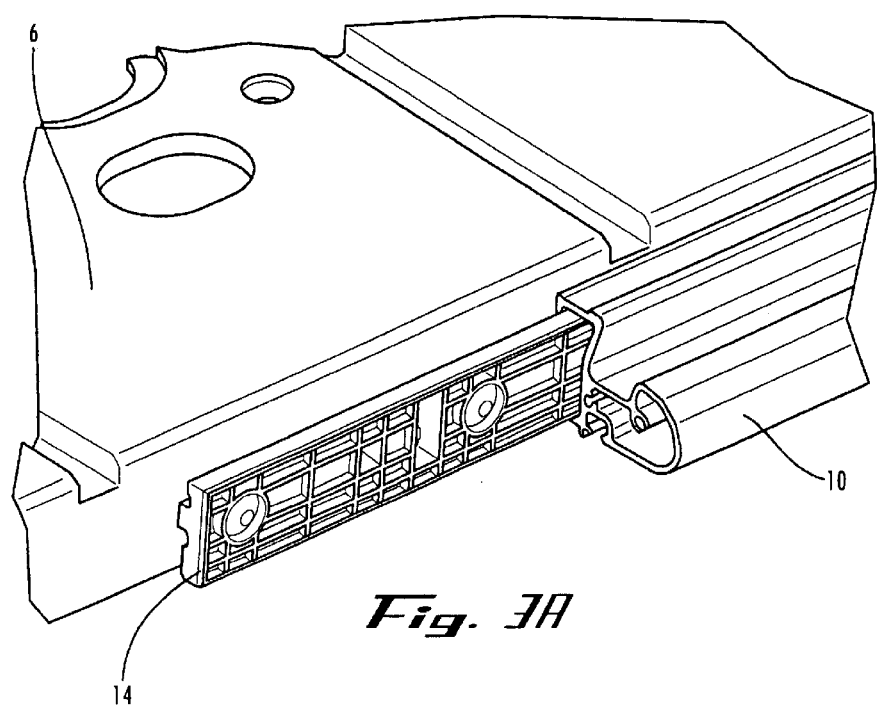
FIG. 3A is a partial perspective view of the table saw according to FIG. 1 illustrating the rip fence rail and slide.
Figure 17:
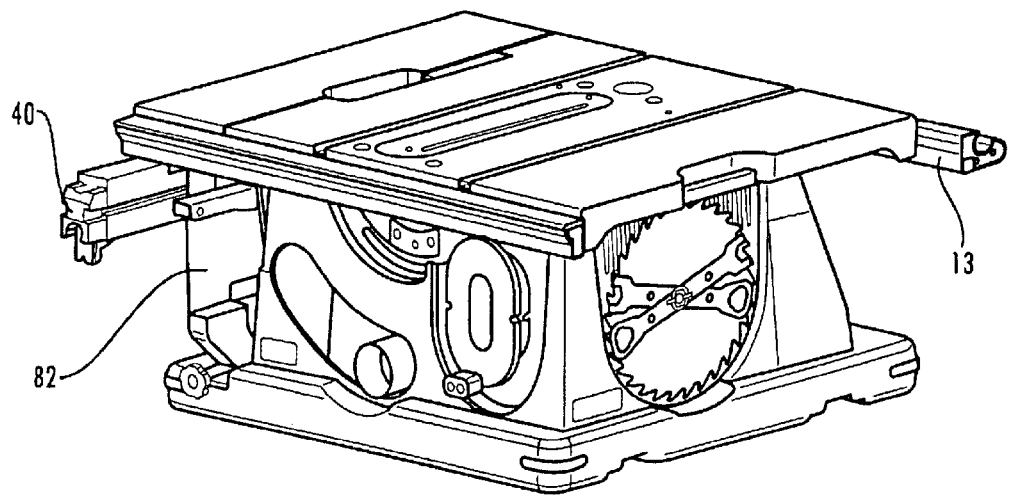
FIG. 17 is another perspective view of the table saw according to FIG. 15.
Figure 18:
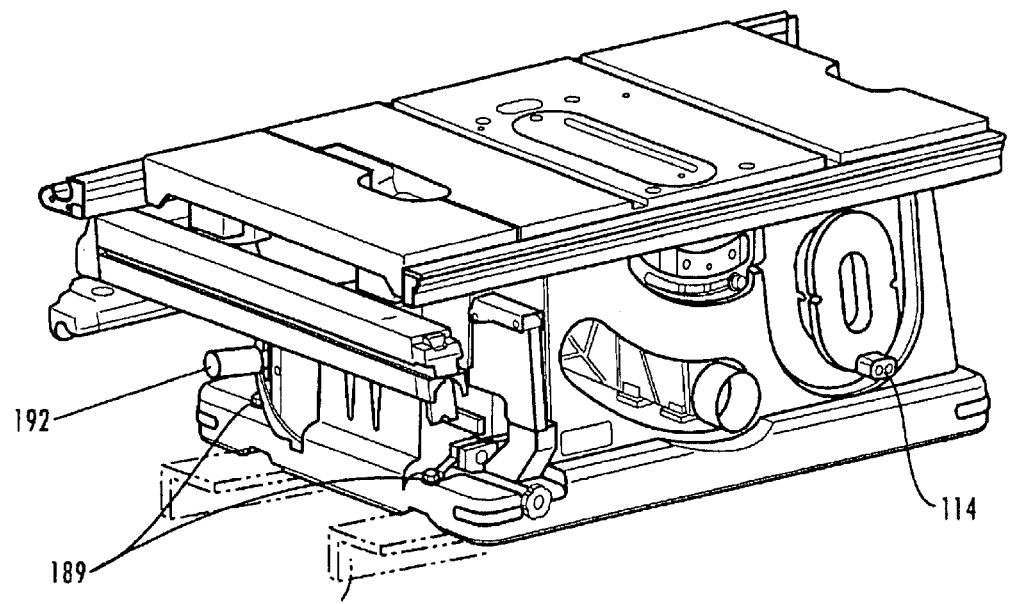
FIG. 18 is another perspective view of the table saw according to FIG. 15.

Turning next to FIGS. 3 and 3A, first table 6 includes a fence rail/table lock facilitated by lock 16. FIG. 3 shows a bottom view of first table 6 with lock 16 mounted to second surface 30, and FIG. 3A illustrates a portion of first table 6, with first rail 10 positioned to expose slide 14 attached to first table 6. Lock 16 is used to lock second table 8 at any desired distance from first table 6 within preset limits of travel, for example, about 10.25 to 10.5 inches. Lock 16 is designed in such a manner so as to clamp first rail 10 and second rail 12 to front 17 and back 19 of first table 6 with approximately equal pressure. Lock 16 includes a cam mechanism 26 that is positioned in a bushing 28 that is free to float in a front to back direction. Mounted to cam mechanism 26 are first clamping rod 22 and second clamping rod 24. First clamping rod 22 extends through a hole 11 in first table 6 and through a slot 13 in first rail 10 (slot 13 is shown, for example, in FIG. 17). A tee or other shaped member (not shown) larger than hole 11 is disposed at the distal end of first clamping rod 22. In a manner similar to that disclosed in conjunction with first rail 10, second clamping rod 24 extends through a hole (not shown) in first table 6 and a slot (not shown) in second rail 12 with a tee or other shape larger than the slot in the same manner as described for first clamping rod 22.

As one of the clamping rods 22 or 24 makes contact with the rail 10 or 12 upon rotation of cam mechanism 26, the entire cam mechanism is pulled toward the contacting clamp until the opposite clamp makes contact with its associated rail. The lock thus clamps with an approximately equal force on both rails 10, 12.

Figure 2:
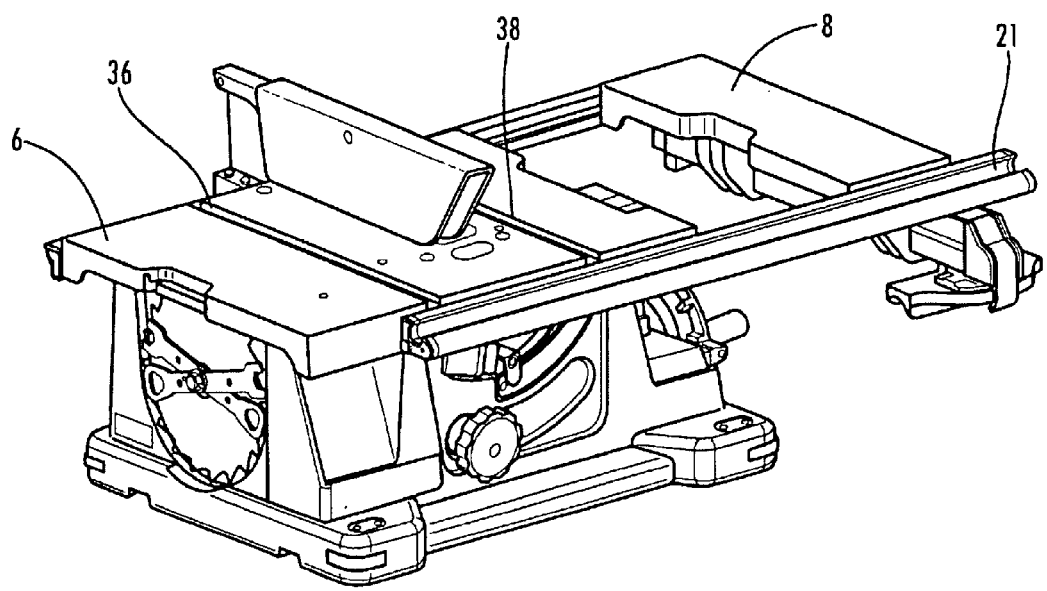
FIG. 2 is a perspective view of the table saw according to FIG. 1 with the second table extended.
Figure 4:
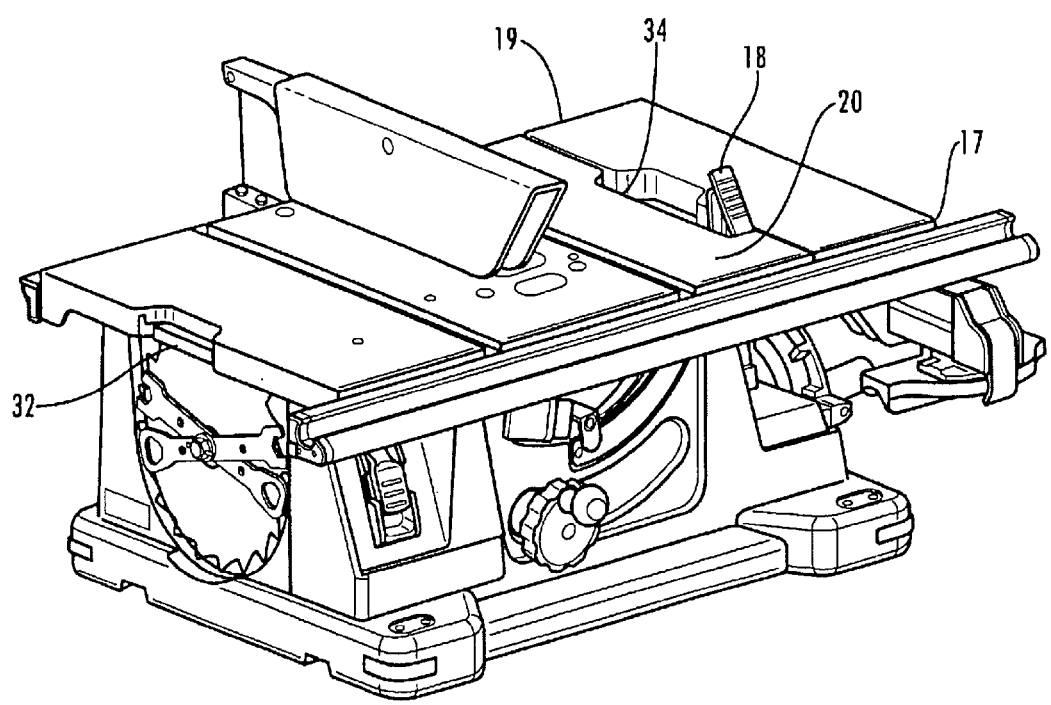
FIG. 4 is a perspective view of the table saw according to FIG. 1 with the second table unlocked.

A lock lever 18 is attached to cam mechanism 26 to aid in the locking rotation of the mechanism. Lock lever 18 is attached opposite second surface 30. Lock lever 18 is located in a position such that it extends from a first surface 20 when in the unlocked position shown in FIG. 4. The extended position is such that it obstructs the operator from using table saw 2 if the lock 16 is not engaged. This obstruction facilitates the safety of the operator as the table saw may not be conveniently used with the second table unlocked. When the locking mechanism 16 is rotated to the locked position as shown in FIGS. 1 and 2, lock lever 18 is flush or below the first, or top, surface 20.

Figure 5:
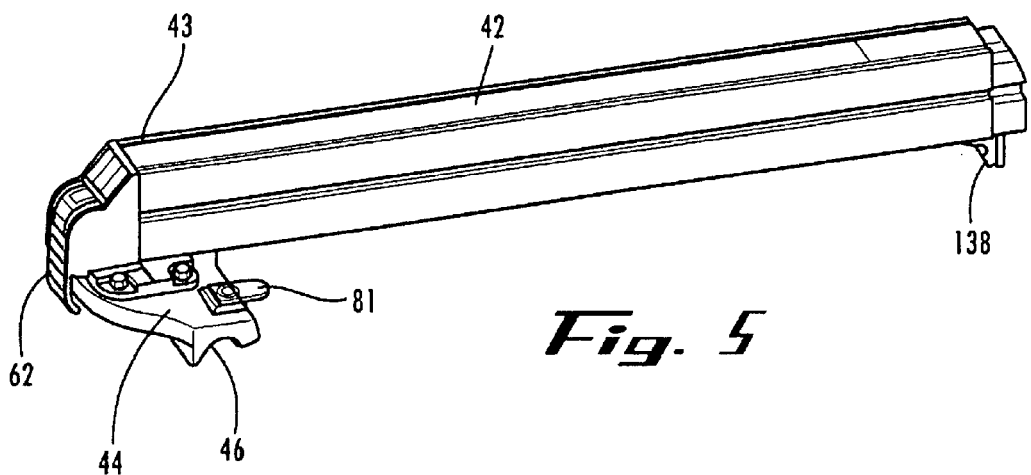
FIG. 5 is a perspective view of a rip fence in accordance with one embodiment of the present invention.
Figure 6:
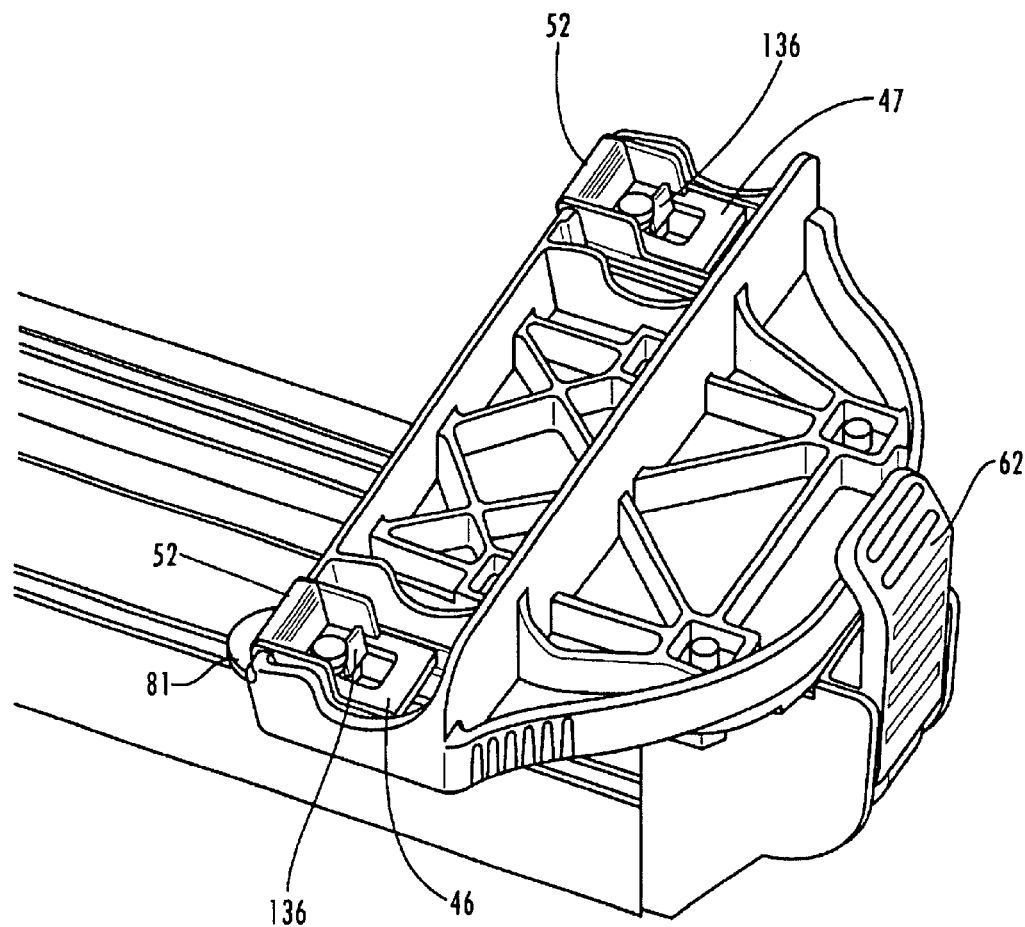
FIG. 6 is a bottom view of the rip fence according to FIG. 5.
Figure 7:
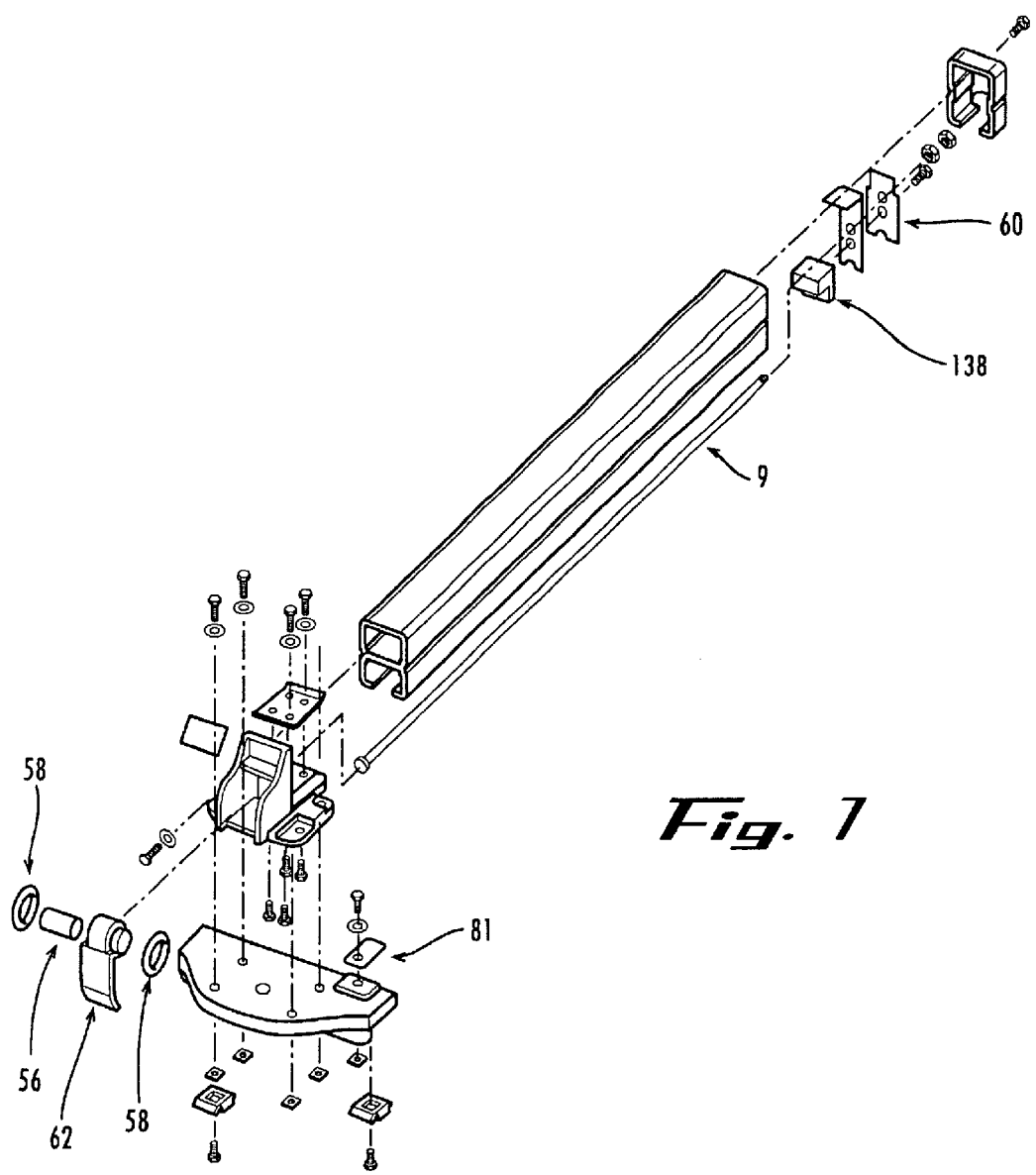
FIG. 7 is an exploded view of the rip fence according to FIG. 5.

Table saw 2 further includes a rip fence 40, an embodiment of which is illustrated in FIGS. 5–7. Rip fence 40 may attach to table saw 2 via first and second rails 10 and 12. Rip fence 40 may include a longitudinal body 42 with a head 44 attached to a first end 43. Head 44 has at least one bead glide 46, preferably having two bead glides 46 and 47 shown in FIG. 6. Head glides 46 and 47 are engagable with first rail 10. Head 44 also includes at least one spring finger 136 incorporated onto the head glides such that head 44 is biased to squared engagement with first rail 10, with bumpers 52 meeting a face 21 of first rail 10. At a second end 45 of rip fence 40 is a second end glide 138 which is engagable with second rail 12. A fence lock rod 9, shown in FIG. 7, extends substantially the entire length of rip fence 40 and enables locking engagement of the rip fence with first and second rails 10 and 12. At the head 44 end of fence lock rod 9, the lock rod engages a fence cam lever 62. Fence can lever 62 includes a pin cam 56 and annular contact ball bearings 58. The opposing end of fence lock rod 9 is attached to a plate lock 60. Rip fence 40 may be locked in essentially any position along rip fence rails 10 and 12 by placing the rip fence glides 46, 47, and 138, onto rip fence rails 10 and 12, and then rotating fence cam lever 62 to the locked position. The rotation of fence cam lever 62 transmits a force along fence lock rod 9, which in turn "squeezes" bumper 52 into frictional engagement with face 21 of first rail 10 while also forcing second end glide 138 into similar engagement with second rail 12. Spring fingers 136 continue to ensure the engagement of head 40 with rail 10 remains square.

Figure 8:
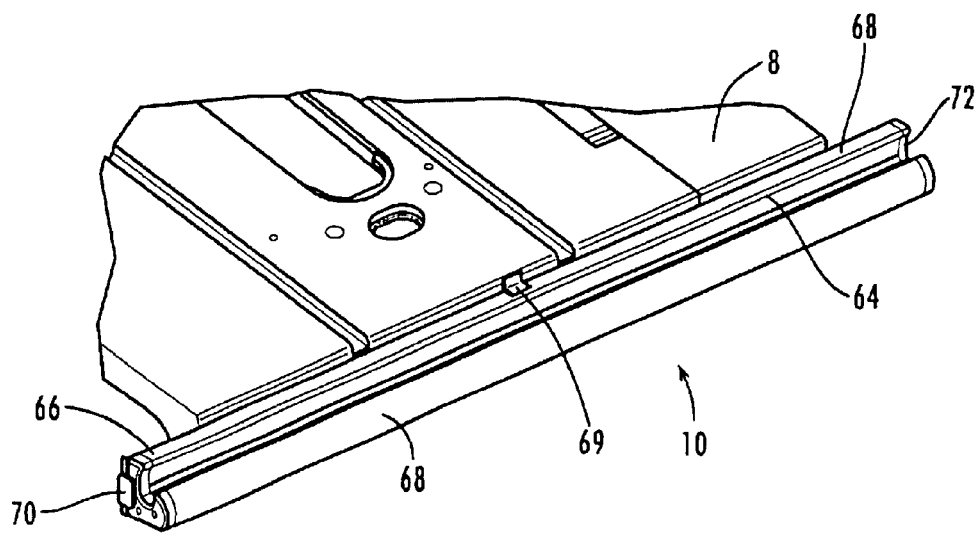
FIG. 8 is a partial perspective view of the rip fence scale in accordance with one embodiment of the present invention.
Figure 9:
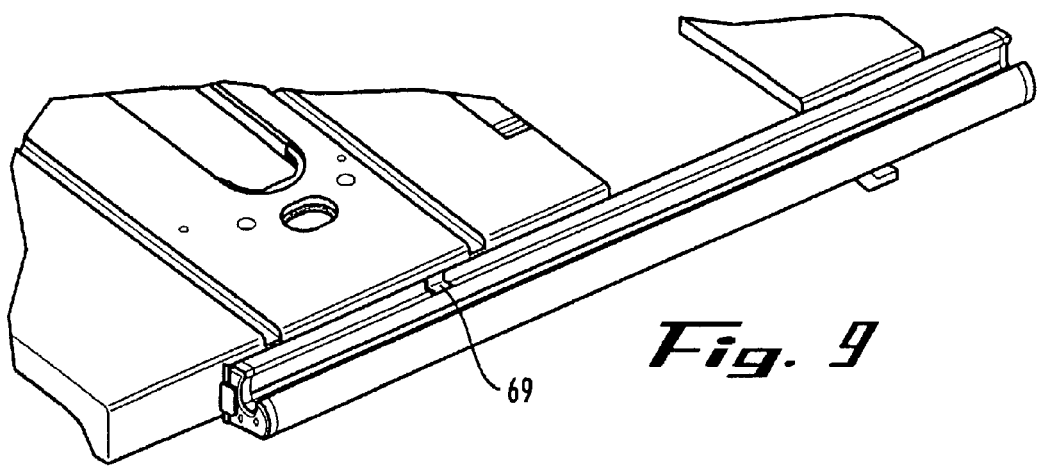
FIG. 9 is a partial perspective view of the rip fence scale according to FIG. 8 with the second table extended.
Figure 10:
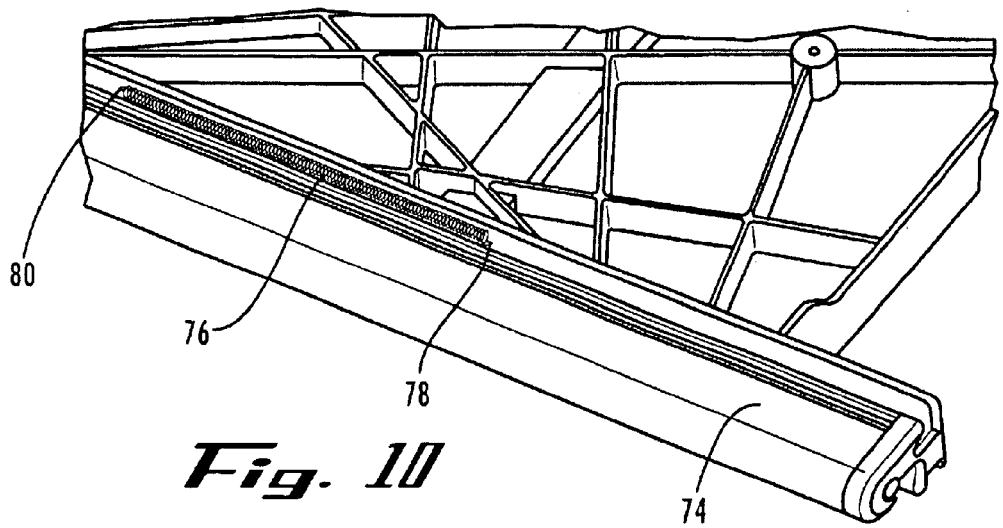
FIG. 10 is a partial bottom view of the rip fence scale shown in FIG. 8.

Turning next to FIGS. 8–10, a rip fence scale 64 attached to table saw 2 in accordance with one embodiment of the present invention is disclosed. Rip fence scale 64 is designed to allow a single scale to be used while second table 8 is in any of its infinite positions without having to readjust the scale every time the second table is moved.

Figure 20:
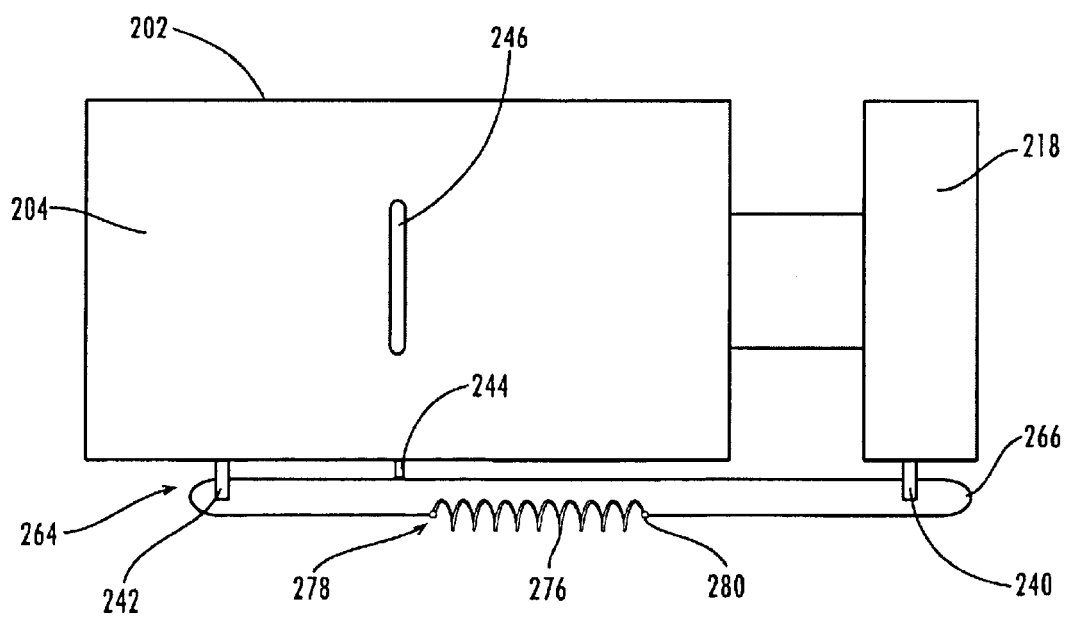
FIG. 20 is a block diagram conceptually illustrating a rip fence scale in accordance the present invention.

FIG. 20 conceptually illustrates the operation of a rip fence scale such as rip fence scale 64 illustrated in FIGS. 8–10. Referring to FIG. 20, rip fence scale 264 includes flexible tape measure 266 having first end 278 and second end 280. Flexible tape measure 266 extends around two guides 240 and 242 in a closed loop configuration. The loop is closed by a tensioned fastener 276 that connects first end 278 and second end 280. One point 244 of flexible tape measure 266 is fixed to a stationary base portion 204 of table saw 202. The fixed point 244 is substantially aligned with a blade 246 of table saw 202. First guide 240 may be attached to a table extension, such as the table extension 218, which may include the elements described above for second table 6, or the extension may be any other conventional table saw extension known in the art. Flexible tape measure 266 travels around guides 240 and 242 in response to movement of table extension 218 toward or away from base 204. The configuration conceptually illustrated in FIG. 20 thus provides a scale 264 that extends along the entire extended working length regardless of the position of the table extension 218, while ensuring that fixed point 244 remains aligned with blade 246.

In the embodiment shown in FIG. 8, rip fence scale 64 is incorporated into first rail 10. Rip fence scale 64 includes a flexible tape measure 66 extending along a top side 68 of first rail 10 and continuing around both first 70 and second 72 ends of the first rail 10 to extend along at least a portion of the length of an underside 74 of the first rail 10. A tension spring 76 is shown in FIG. 10, which connects first end 78 and second end 80 of flexible tape measure 66. In the embodiment shown in FIG. 10, the connection of first 78 and second 80 ends is at underside 74 of rail 10. Flexible tape measure 66 is fixedly mounted to first table 6 at least at one point 69. In the illustrated embodiment, point 69 is fixed relative to the saw blade.

When second table 8 is moved away from first table 6, flexible tape measure 66 is pulled under the first end 70 of fence rail 10. At the same time, tape measure 66 is pulled up onto the top side 68 of rail 10 at second end 72. Constant tension is maintained on the flexible tape measure with the use of tension spring 76 that connects first and second ends 78 and 80 of flexible tape measure 66. It will be understood with the benefit of this disclosure that any other conventional tensioned fastener may take the place of spring 76.

The exemplary rip fence 40 shown in FIGS. 5–7 includes an indicator 81. When rip fence 40 is attached to table saw 2 via first and second rails 10 and 12, the indicator 81 is situated relative to rip fence scale 64 so as to indicate the distance from the saw blade to the edge of the rip fence 40.

FIGS. 8 and 9 illustrate the movement of flexible tape measure 66 as second table 8 moves away from first table 6. FIG. 8 shows rip fence scale 64 with second table 8 in close proximity to first table 6, while FIG. 9 shows the change in rip fence orientation with second table 8 removed some distance from first table 6. Fixed point 69 remains in place relative to the blade before and after movements of second table 8 to simplify the measurement capabilities of the user before and after moving the second table. The distance traveled by flexible tape measure 66 is substantially equal to the distance second table 6 moves relative to first table 8. Substantial equality means that to one of ordinary skill in the art with the benefit of this disclosure, no readjustment of the flexible tape measure 66 would be necessary following the movement of second table 8 while maintaining accurate measurement abilities from readings on the scale.

Figure 11:
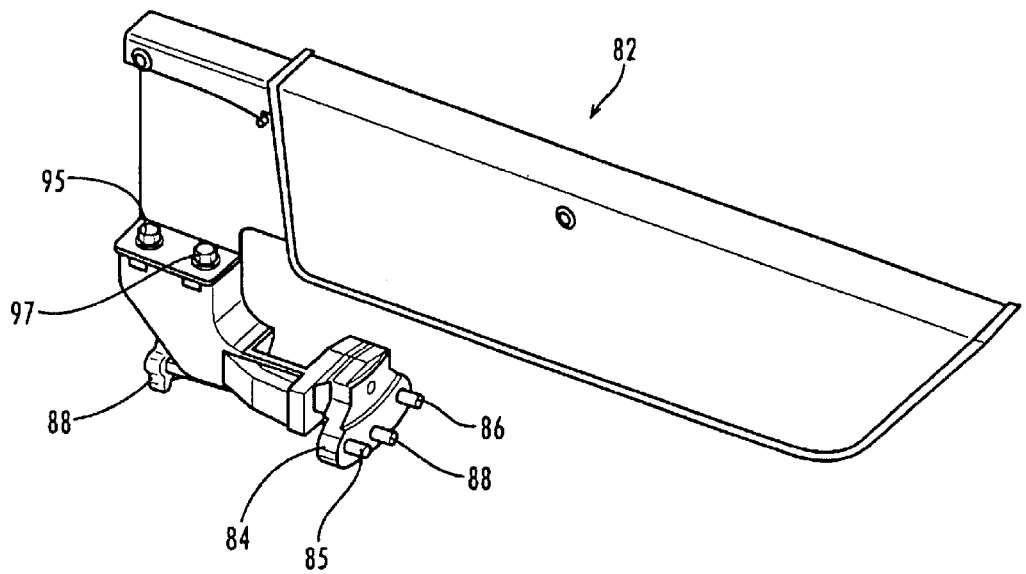
FIG. 11 is a perspective view of a blade guard in accordance with one embodiment of the present invention.
Figure 12:
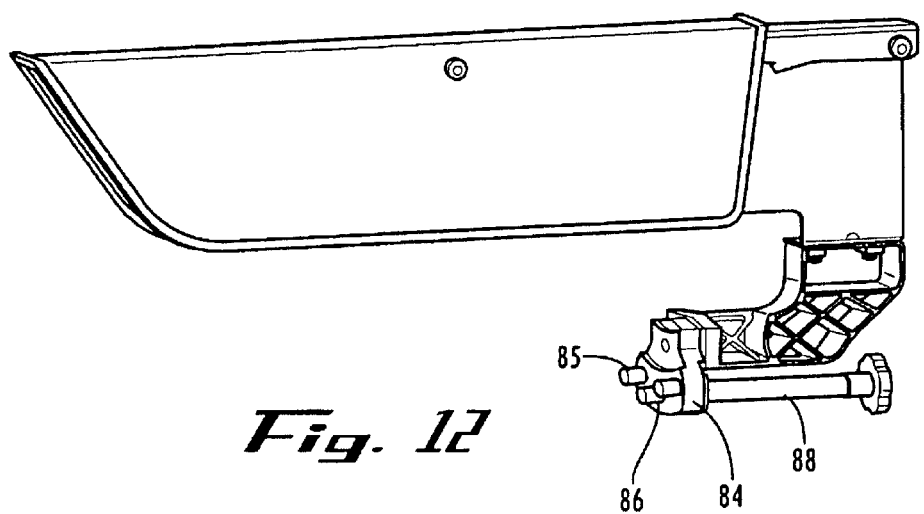
FIG. 12 is an opposite perspective view of the blade guard according to FIG. 11.

Turning next to FIGS. 11 and 12, a blade guard 82 as first seen in FIGS. 1 and 2 is shown in detail. Blade guard 82 includes mounting plate 84 with at least two pins 85 and 86 extending therefrom. In the embodiment shown in FIGS. 11 and 12, pins 85 and 86 are supplemented by an attachment device such as threaded knob 88. It will be understood by one of skill in the art with the benefit of this disclosure that either or both of pins 85 or 86 may be replaced by threaded knob 88, wherein only two protruding pins instead of the three shown in FIGS. 11 and 12 would result. Threaded knob 88 is engagable with a hole 89 (shown in FIG. 14) to securely fasten blade guard 82 to table saw 2. Blade guard 82 is designed for easy removal to facilitate the portability and the making of non-through cuts with table saw 2. Blade guard 82 is held in place by threaded knob 88 and is self aligned as pins 85 and 86 are inserted into mating holes 91 and 93 (shown in FIG. 14). One of skill in the art with the benefit of this disclosure will observe that according to the disclosed blade guard design, all adjustments to align the blade guard 82 with blade 146 are made independent of mounting plate 84, and thus after a first alignment there is no need to realign the guard each time the guard is reinstalled. The pins ensure that the guard realigns in the position adjusted to by the first alignment. The first alignment may be accomplished by loosening one or both of bolts 95 and 97 of blade guard 82, aligning the guard and blade, and subsequently tightening the bolts. After this initial alignment requiring the adjustment of bolts 95 and 97, removal of the blade guard 82 and any subsequent re-attchments will result in a self aligned blade guard as pins 85 and 86 and threaded knob 88 engage their respective holes in table saw 2.

Figure 13:
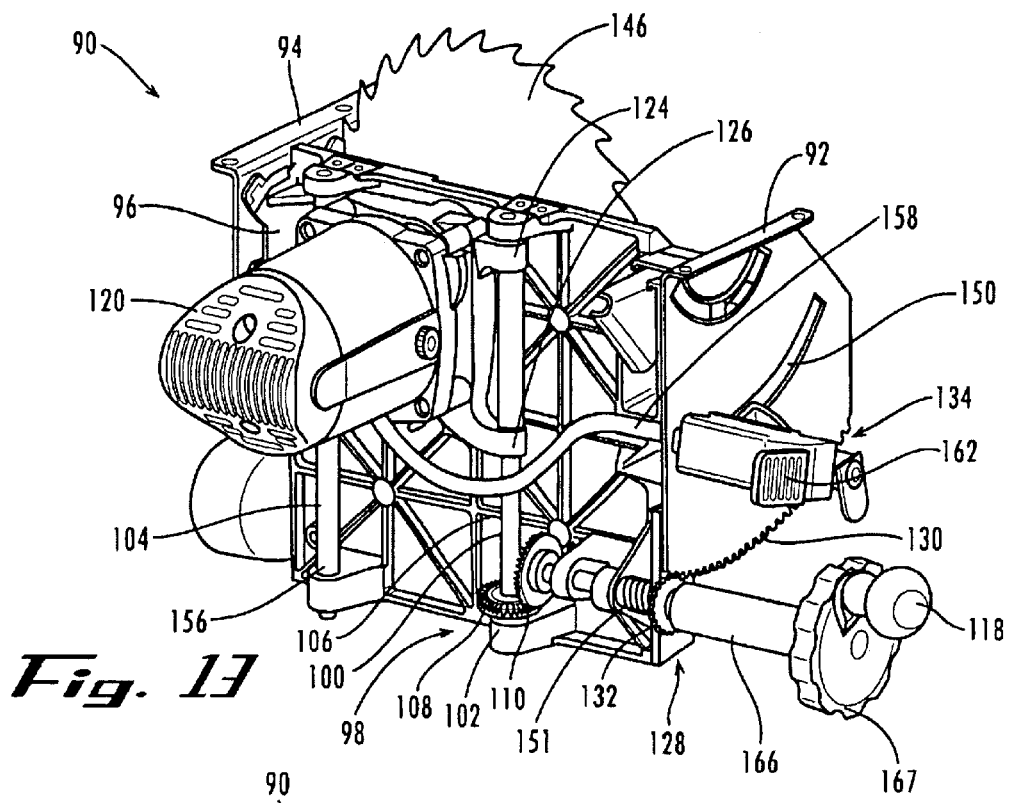
FIG. 13 is a perspective view of the cradle assembly in accordance with one embodiment of the present invention.
Figure 14:
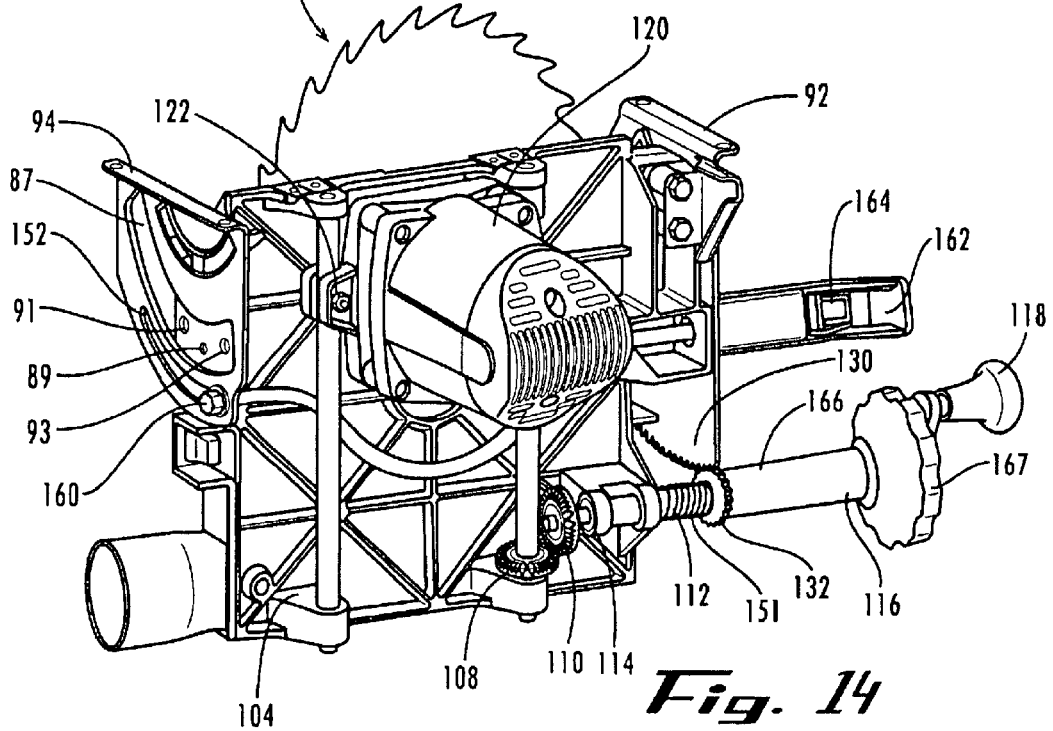
FIG. 14 is another perspective view of the cradle assembly according to FIG. 13.

Turning next to FIGS. 13 and 14, a cradle assembly 90 for holding a motor assembly 120 and blade 146 for use with table saw 2 in accordance with one embodiment of the present invention is disclosed. Cradle assembly 90 preferably includes both an elevation mechanism 98 and a beveling mechanism 128, but it may include only one of the two mechanisms. As shown in FIGS. 13 and 14, cradle assembly 90 may include a cradle 96 having a pivotal mount comprising first mount 92 and second mount 94. Elevation mechanism 98 is mounted to cradle 96. Elevation mechanism 98 is used to raise and lower motor assembly 120 and blade 146 so as to allow the operator to adjust the depth of the table saw cuts. Elevation mechanism 98 includes a first bar 100 with a first end 102 and a second bar 104. First bar 100 has a threaded portion 106 and has a first bevel gear 108 attached to first end 102. A second bevel gear 110 engages first bevel gear 108, the second bevel gear being attached to a first end 114 of a crankshaft 112. A crank handle 118 is attached to a second end 116 of crankshaft 112.

Motor assembly 120 is attached to elevation mechanism 98 at three mounting points. This constitutes an advantage over conventional elevation mechanisms that typically include more than three mounting points and more than two bars. First mounting point 122 may be seen in FIG. 14 between motor assembly 120 and second bar 104. Preferably, the mounted connection between second bar 104 and first mounting point 122 is slidable. Second bar 104 is a guide bar and restricts motor assembly 120 from pivoting left and right (as viewed in FIG. 13). A second mounting point 124 shown in FIG. 13 connects motor assembly 120 to first bar 100. In the embodiment shown in FIG. 13, second mounting point 124 attaches to an unthreaded portion of first bar 100, however, threaded portion 106 may extend all the way to second mounting point 124 in an alternative embodiment. A third mounting point 126 connects motor assembly 120 to the threaded portion 106 of first bar 100. The combination of first bar 100 and second and third mounting points 124 and 125 prevent motor assembly 120 from rotating from front to back (as viewed in FIG. 13).

The threaded portion 106 of first bar 124 engages third mounting point 126 such that with the rotation of first bar 100, motor assembly 120 moves up or down along the longitudinal axis of first and second bars 100 and 104, depending on the direction of rotation. Rotation is normally facilitated by crank handle 118, which may be rotated by an operator, which in turn rotates first bar 100 via bevel gears 108 and 110.

Cradle assembly 90 may also include the beveling mechanism 128 as shown in FIGS. 13 and 14. Beveling mechanism 128 includes a gear rack 130 along an edge of first cradle mount 92. Engagable with gear rack 130 is a gear 132. Gear 132 and gear rack 130 enable an operator to rotate cradle 96 to any desirable angle, most typically in the range of between 0 and 45 degrees. Gear 132 is part of a sliding sleeve 166 with a hand wheel 167 opposite the gear. Sliding sleeve 166 is mounted around the outer diameter of second end 116 of crankshaft 112. Sliding sleeve 166 rotates independently of crankshaft 112 to allow independent adjustment of elevation and bevel angle. Sliding sleeve 166 may also be slid along the longitudinal axis of crankshaft 112 to disengage gear 132 from gear rack 130 to facilitate quick rotation of large bevel angles that may take more time by rotation of the gear while engaged with the gear rack. A spring 151 biases gear 132 into engagement with gear rack 130, but a small force on sliding sleeve 166 transmitted by an operator may easily disengage the gear from the rack.

Bevel mechanism 128 may also include a locking mechanism 134 for securing the cradle assembly 90 in any desired bevel angle. The locking mechanism includes a locking bar 156 with first end 158 and second end 160, which extends through first slot 150 and second slot 152, respectively, of mounts 92 and 94. Typically first and second slots 150 and 152 will span approximately 45 degrees in an arcuate manner. In the embodiment of FIGS. 13–14, locking bar 156 is U-shaped, but one of skill in the art with the benefit of this disclosure will recognize that other shapes for locking bar 156 may be used. The exemplary U-shaped locking bar 156 illustrated allows clearance for the other parts in the assembly. First end 158 of locking bar 156 is connected to a cam 164 and lever 162. Cam 164 and lever 162 are rotatable to a locked and an unlocked position. When cam 164 and lever 162 are rotated to the locked position shown in FIG. 13, a clamping force from the cam is transmitted to first and second mounts 92 and 94 via locking bar 156. The U-shape of locking bar 156 causes it to act as a spring. When lock 134 is locked, it attempts to straighten locking bar 156. The resistance of U-shaped locking bar 156 causes mounts 92 and 94 to clamp down on the cradle. This clamping action keeps the cradle assembly 90 in the desired angled position.

Operation of the beveling mechanism may be as follows. When a user is required to set motor assembly 120 and blade 146 at a precise cutting angle, the user may rotate gear 132 via hand wheel 167, thereby precisely rotating cradle 96 to the desired angle. The user may then rotate lever 162 to lock cradle 96 in position. Since, for precise adjustments, gear 132 is engaged with gear rack 130, the motor assembly 120 remains at the desired cutting angle even after the user releases the hand wheel 167. This facilitates "one-handed" adjustments, wherein the user may set the cutting angle via hand wheel 167, then release hand wheel 167 and actuate lever 162 with the same hand to lock cradle 96 at the set angle.

If, on the other hand, the operator wants to quickly adjust the bevel angle from 0 to 45 degrees, for example, the operator may press on hand wheel 167 to disengage gear 132 from rack 130 and quickly rotate the cradle to the desired angle before again locking the cradle in position. Thus, this disengagable gear 132 and rack 130 offer considerable advantages over the prior art in ease of use and precision of bevel angle.

As discussed above, cradle 96 includes a plurality of holes 89, 91, and 93 for receiving aligning pins 85, 86, and threaded knob 88. Holes 89, 91 and 93 are accessible via an opening 87 in second mount 94. Including holes 89, 91, and 93 on second mount 94 facilitates alignment between blade guard 82 and blade 146.

Figure 15:
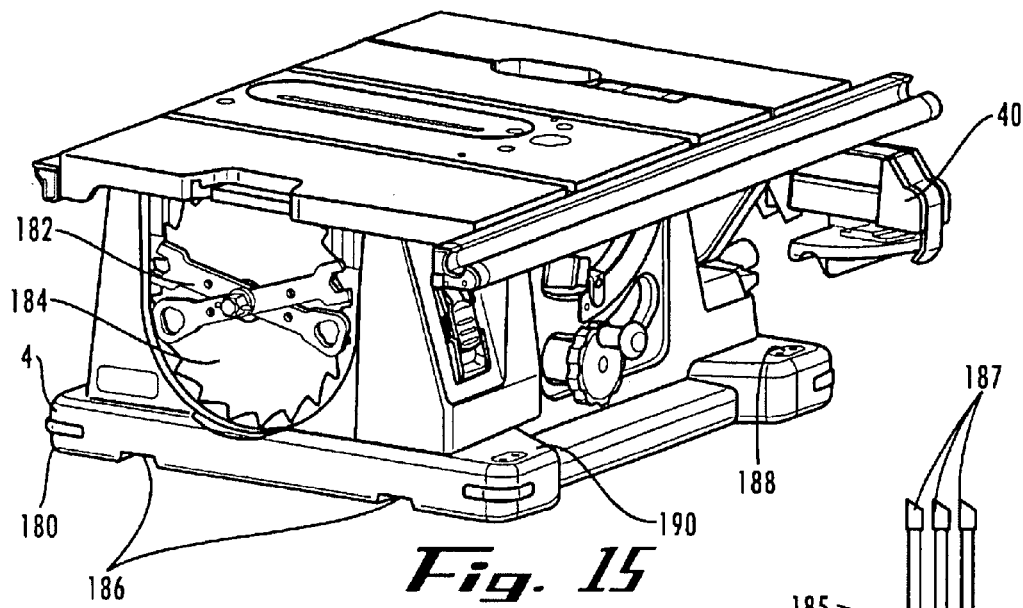
FIG. 15 is a perspective view of the table saw in accordance with one embodiment of the present invention with the attachments in their respective storage positions.
Figure 15A:
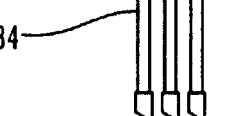
FIG. 15A is a close-up view of the blade storage illustrated in FIG. 15.
Figure 16:
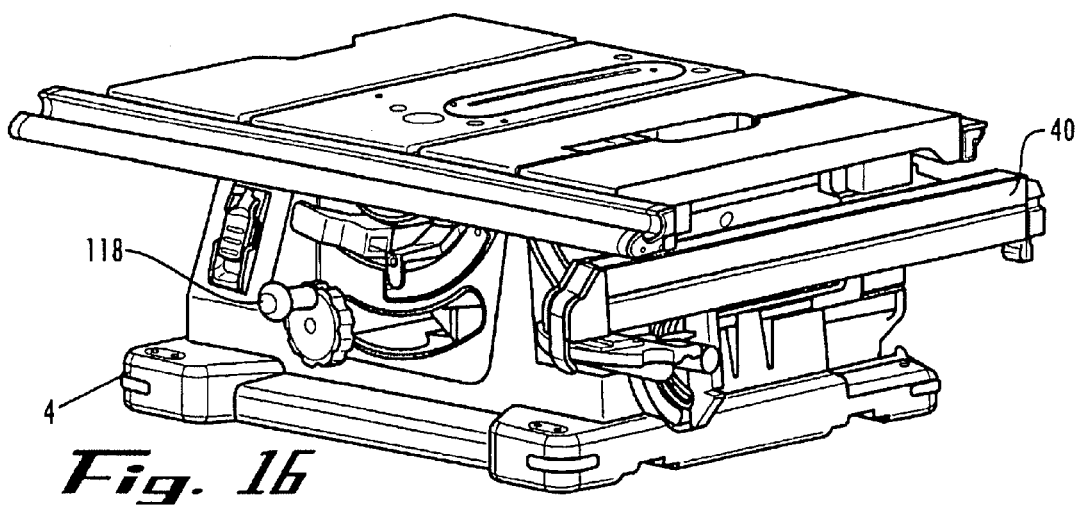
FIG. 16 is another perspective view of the table saw according to FIG. 15.

Turning next to FIGS. 15–19, the portable table saw 2 has the capacity to store a number of accessories to facilitate easy transport. Moreover, base 4 is a two-part assembly—lower part 180 adds stiffness and acts a skid to allow table saw 2 to slide easily on rough or uneven surfaces. Storage for rip fence 40, miter gauge 192, blade guard 82, blade wrenches 182, blades 184, and power cord 194 are all provided on the saw. The storage is designed such that the saw 2 can be turned and tilted in virtually any direction without the components detaching while in the stored positions. Referring to FIG. 15A, spacers 185 are provided that may be placed between spare blades 184 that are being stored on the saw 2. When the spacers are placed between the blades, the tips 187 of the blades 194 are protected from contacting one another which protects tips 187 from being chipped or broken.

Figure 19:
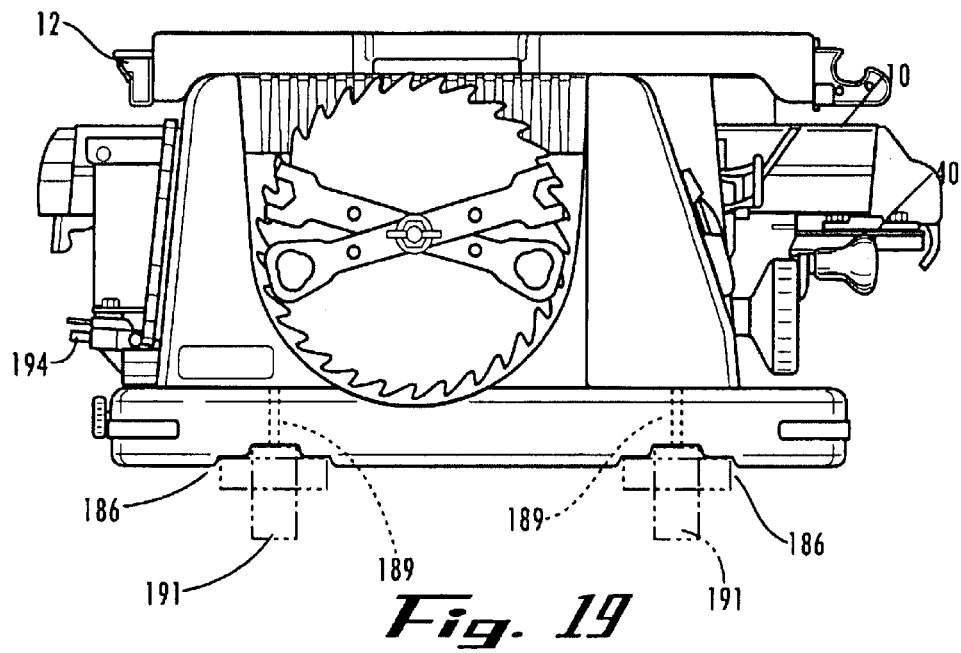
FIG. 19 is another perspective view of the table saw according to FIG. 15.

Base 4 has multiple sized grooves 186 sized for standard 2-by stock on edge or for 2×4 laying flat as shown in FIG. 19. Holes 189 are also provided above each groove 186 to allow table saw 2 to be screwed down to a sawhorse 191. Holes 188 are provided for both screws and bolts on all four corners of base 4 as well as a flat area 190 that may be used for clamping the saw down.

While the present invention has been particularly shown and described with reference to a particular illustrative embodiment thereof, it will be understood by those skilled in the art that various changes in form and details may be made without departing from the spirit and scope of the invention. The above-described embodiment is intended to be merely illustrative, and should not be considered as limiting the scope of the present invention.

What is claimed is:

1. A table saw comprising:
    a base;
    a first table mounted to the base, wherein the first table has a work support surface defining a plane;
    a saw blade operably supported by the base and extendable through the work support surface;
    a second table;
    first and second rails having first and second ends, wherein the rails are slidably mounted to the first table and the second ends are rigidly mounted to the second table such that the second table is slidably movable relative to the first table;
    a locking mechanism connected to at least one of the first or second table, the locking mechanism including a locked position in which the second table is locked relative to the first table, and an unlocked position in which the second table is movable relative to the first table; and
    the locking mechanism including a lever that extends from the plane of the work support surface to a work support side of the plane when in the unlocked position to obstruct the use of the table saw.

2. The table saw according to claim 1, wherein the locking mechanism secures the second table in any position relative to the first table within a set of predetermined limits of travel.

3. The table saw according to claim 2, wherein the locking mechanism comprises means for applying equal locking pressure to the first and second rails.

4. The table saw according to claim 2, wherein the locking mechanism comprises a cam positioned in a free floating bushing.

5. The table saw according to claim 4, wherein the lever is connected to the cam, and wherein the cam is connected to opposing first and second clamping rods, the clamping rods being engagable with the first and second rails to lock the second table in any position relative to the first table when the lever is in a locked position.

6. The table saw according to claims 4, wherein the first table defines a second surface opposite the work support surface, and wherein the locking mechanism is attached to the second surface.

7. The table saw according to claim 1, wherein at least one carrying handle is formed into the first table to facilitate the portable transport of the table saw.

8. The table saw according to claim 1, wherein the lever lies generally within the plane of the work support surface in the locked position.

9. A table saw comprising:

a base;

a first table mounted to the base, wherein the first table includes a work support surface defining a plane;

a saw blade operably supported by the base and extendable through the first work support surface;

a second table operably connected to the first table and movable relative to the first table;

a locking mechanism connected to at least one of the first or second table, the locking mechanism having locked and unlocked positions, wherein the locked position fixes the second table relative to the first table, and the unlocked position allows the second table to move relative to the first table; and the locking mechanism including a lever that extends from the plane of the first work support surface to a work support side of the plane when in the unlocked position to obstruct the use of the table saw.

* * * * *